UNITED STATES PATENT OFFICE 2,354,947

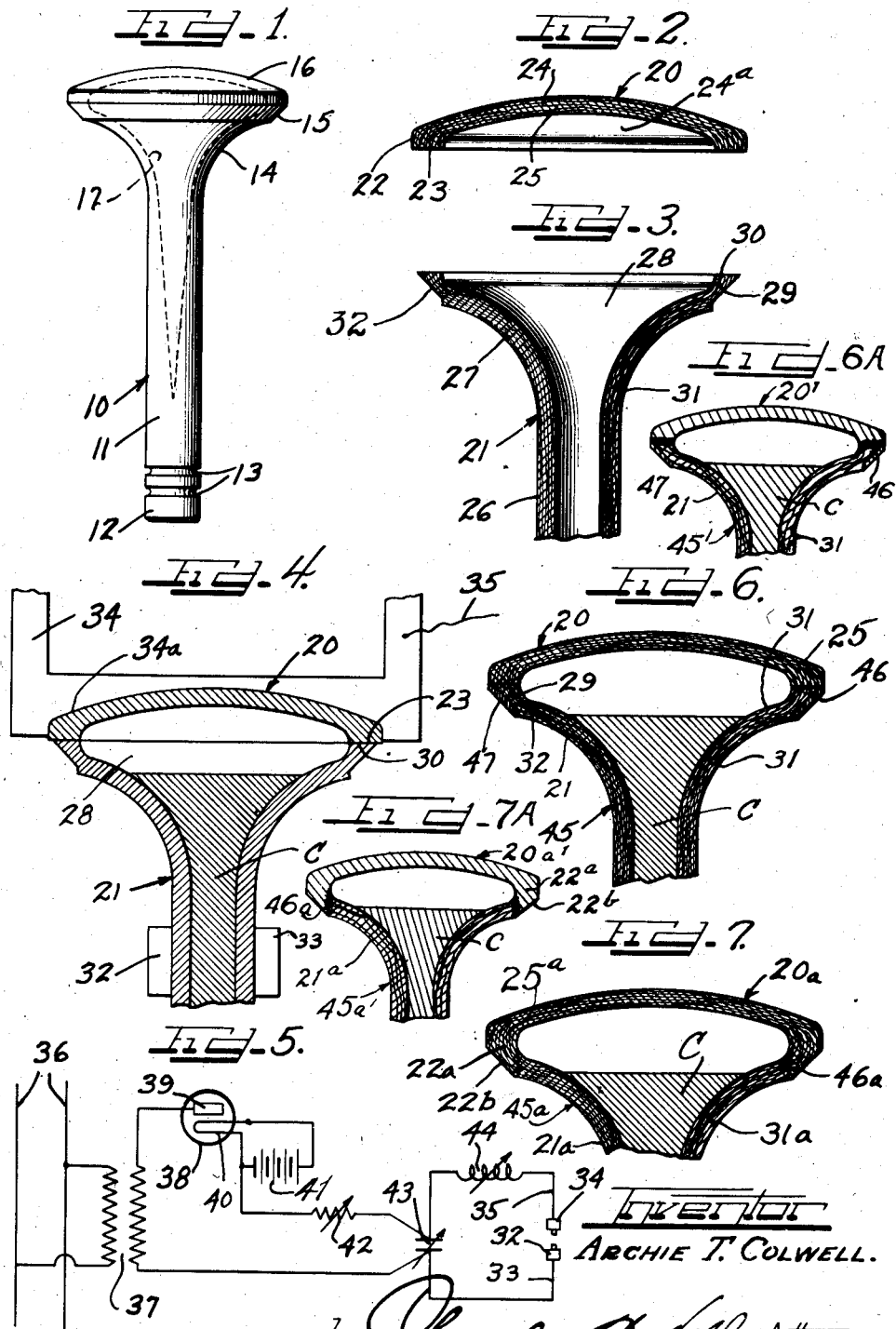

HOLLOW HEAD POPPET VALVE

Archie T. Colwell, Cleveland, Ohio, assignor to Thompson Products Incorporated, Cleveland, Ohio, a corporation of Ohio Application August 30, 1940, Serial No. 354,787

5 Claims. (Cl. 123—188)

This invention relates to poppet valves for internal combustion engines and especially exhaust poppet valves for internal combustion engines.

More specifically the invention relates to poppet valves formed from cap and stem body members integrally united together without appreciable heating of the parts for elimination of oxidation.

While hollow poppet valves having head caps welded to stem body members are known, these valves are not suitable for use in modern high compression internal combustion engines since the metal parts will not withstand the tremendous pressures and corrosive action of the gases in the engine. Likewise, ordinary welding of the caps to the body members will not produce satisfactory bonds to permanently unite the parts while at the same time completely sealing the cooling material in the valves.

According to this invention metal caps and stem body portions are so formed that all exterior surfaces of the finished valve are defined by the sides only of metal grain bands and the ends of the metal grain bands are confined within a weld area instantaneously produced by high frequency electric current discharge between the parts. The ends of the grain bands are thus integrally united into a unitary part and the entire head area of the valve which is exposed to the corrosive gases in the internal combustion engine is defined by the sides only of metal grain bands. The sides of the grain bands resist corrosion much better than the ends of the bands, and, as a result, the valves of this invention will have a longer operating life.

A feature of the invention includes the provision of mating rim areas on the head caps and stem bodies, which areas are defined by the terminal ends of the metal grain bands. The rims are pressed together and a surge of very high frequency current is passed between the mating rims to instantaneously fuse the same together without, however, heating the remainder of the metal parts. Since hollow valves are frequently filled with metallic sodium as a coolant, and since sodium is readily oxidized, the welding step used in this invention is of great importance in preventing oxidation of the sodium. The welding step likewise prevents oxidation of the metal caps and stem body members thereby preventing the formation of an oxide coating on the interiors of these members. Such an oxide coating interferes with heat transfer between the valve body and the coolant since it prevents the coolant from making good contact with the metal.

It is, then, an object of this invention to provide hollow head poppet valves from separate cap members and stem body members without exposing the ends of metal grain bands in said members along any exterior surface in the head area of the finished valve.

A specific object of the invention is to provide a hollow head metal poppet valve including a welded circular area of apreciable width defined by the ends of metal grain bands so as to confine said ends against exposure to corrosive action by gases in which the valve operates.

A further object of the invention is to provide a hollow head metal poppet valve containing a cooling medium completely enclosed therein by means of a welded bond effected without raising the temperature of the coolant sufficiently to oxidize the same.

Other and further objects of the invention will become apparent to those skilled in the art from the following detailed description of the annexed sheet of drawings which illustrates preferred embodiments of the invention.

On the drawing:

Figure 1 is a side elevational view of a hollow head poppet valve according to this invention.

Figure 2 is a vertical cross-sectional view taken through a valve head cap used in making the valves of this invention.

Figure 3 is a fragmentary vertical cross-sectional view taken through a stem body member used in making the valves of this invention.

Figure 4 is a cross-sectional view taken through the cap and body members of Figures 2 and 3, illustrating the same mounted in position for welding.

Figure 5 is an electrical diagram illustrating a flash welding apparatus for uniting the parts shown in Figure 4.

Figure 6 is a fragmentary vertical cross-sectional view of the valve formed from the parts shown in Figure 4 and illustrating the welded bond integrally uniting the parts.

Figure 6A is a view similar to Figure 6 but illustrating the valve with a cast head cap.

Figure 7 is a fragmentary vertical cross-sectional view of a modified form of valve according to this invention.

Figure 7A is a view similar to Figure 7 but illustrating the modified valve form with a cast head cap.

As shown on the drawing:

In Figure 1 the reference numeral 10 designates generally a hollow poppet valve having a cylindrical stem portion 11 provided with a solid bottom end 12 having peripheral grooves 13 therein for receiving a valve spring retainer lock. The upper end 14 of the stem 11 is flared outwardly to an inclined valve seat portion 15. The outwardly flaring portion 14 is conveniently referred to as a "tulip" end on the valve stem. The valve 10 has a dome-shaped top 16. The interior of the valve has a cavity 17 flaring outwardly at the head portion into close proximity with the valve seat 15 and extending into the stem portion 11 as shown in dotted lines. This cavity 17 is partially filled with a coolant C such as metallic sodium. In operation the head area of the valve is heated by the exhaust gases surrounding the valve head. The metallic sodium in the cavity 17 will be melted and will serve to dissipate heat down into the stem portion 11 of the valve thereby cooling the head end of the valve.

As shown in Figures 2 and 3, the valve 10 is built up from a head cap member 20 and a stem body member 21. The cap member 20 is forged and machined from a circular metal disk to form a dependent circular flange 22 with a flat rim bottom 23 and a dome-shaped top wall 24. A recess 24a bounded by the flange 22 and the top wall 24 is thus provided in the cap 20. As shown, the metal grain bands 25 extend longitudinally through the cap member and have their terminal ends at the flat rim 23. Thus all exterior surfaces of the cap 20 are defined by the sides only of the metal grain bands. The rim 23 is defined by the ends of the metal grain bands but, as well be hereinafter explained, this rim portion is confined in a weld area which is not exposed in the finished valve.

The stem body 21 is formed by forging and machining a solid metal rod having the grain bands extending longitudinally from end to end thereof. The body member 21 is composed of a hollow tubular stem portion 26 which is flared out at its upper end 27 to define an open topped cavity 28. The flared out portion 27 forms the tulip end of the stem body. The upper end of the flared out portion 27 is flanged as at 29 to provide a flat walled circular rim 30 around the mouth of the cavity 28. This flat rim has appreciable width and mates with the rim 23 of the cap 20. As shown in Figure 3 the metal grain bands 31 of the body member 21 extend longitudinally throughout the stem portion 26 and are bowed outwardly in the tulip portion 27 and upwardly in the flange portion 29 thus defining the side walls of the stem portion with their sides only. The cavity 28 in the stem body 21 can extend down through the stem portion 26 in the manner shown in dotted lines in Figure 1, or can continue as a straight cylindrical bore into closer proximity with the closed bottom end of the stem.

The outer side wall of the flange 29 is preferably provided with a circumferential groove 32 for a purpose to be hereinafter described.

For uniting the cap 20 to the stem body 21 the rim 23 of the cap is seated on the rim 30 of the body as shown in Figure 4. First of all, however, the cavity 28 in the body 21 is partially filled with a coolant C such as metallic sodium.

In order to permanently unite the cap 20 to the body 21 without oxidizing the coolant or without distorting the metal body members, the stem member 21 is clamped in a supporting electrode 32 having an electrical connection 33 with the apparatus shown in Figure 5. The cap 20 is pressed down on top of the stem body 21 by means of a second electrode 34 having a recess 34a adapted to receive the cap and being connected through a wire 35 with the apparatus shown in Figure 5.

In Figure 5 the reference numeral 36 designates power lines supplying alternating current to a transformer 37. A half-wave rectifier 38 is provided in the circuit and includes a plate 39 receiving current from the transformer 37. The filament 40 of the rectifier is heated by a battery or other source of current 41 in accordance with usual rectifier installation practice.

A variable resistor 42 is mounted in the circuit from the rectifier 38 and a variable condenser 43 receives the charge from the rectifier. The other side of the condenser 43 is directly connected with the transformer 37 as shown.

The condenser 43 discharges through a variable inductor element 44 connected to the wire 35 and to the electrode 34. The other side of the condenser 43 is directly connected through the wire 33 to the electrode 32.

When the cap 21 is mounted on the coolant-filled stem body 21 as shown in Figure 4 and the mating rims 23 and 30 are pressed together under high pressures so as to seal the coolant, a high frequency current is discharged into the electrodes 32 and 34. This frequency is varied for the type of metal to be welded and for the size of the welding area. In welding an area of about two square inches current will flow at the rate of 150,000 amperes at 4000 volts from an 8000 microfarad condenser. The weld is completed in less than 1/1000 of a second.

The great speed of the welding operation prevents oxidation. The weld is probably not over 0.0005 inch in depth.

In the operation of the circuit shown in Figure 5, the condenser 43 is charged for one or two seconds and then discharges its load to the electrodes 32 and 34. The cap 20 and the stem body 21 are thus charged with the high frequency current and the rims 23 and 30 will be instantaneously welded together. Because the welding is effected instantaneously the high frequency current discharge between the pressed-together parts does not heat the entire area of the cap and stem body and the steel parts are thus not oxidized. Likewise the sodium or other coolant C in the stem body is retained in an unoxidized state. This instantaneous welding may therefore be termed a "cold" welding process which maintains the original metallurgical conditions of the parts being welded and eliminates all oxidation of the valve cavity.

The welded-together cap 20 and stem body 21 are then removed from the electrodes 32 and 34 and, as shown in Figure 6, the resulting valve 46 has a weld area 46 of appreciable width uniting the rims of the cap and stem members into an integral part and confining the ends of the grain bands 25 and 31. The groove 32 around the periphery of the flange 29 is filled with a bearing alloy ring 47. Stellite is preferably used. This alloy ring 47 can be welded into the groove 32 by means of an acetylene welding torch and the welding heat will not effect the interior of the valve or the metallic sodium or other coolant therein since the entire valve cavity is sealed by the previously formed weld 46. The sodium will be effective to dissipate heat from the flange area 29 throughout the entire valve. The head of the valve 45 is preferably placed down when the Stellite seat is welded in position so that the entire head area will be cooled by the molten sodium.

Instead of the cap 20 and stem body 21 being in the shape shown in Figures 2, 3, 4 and 6, a cap 20a shown in Figure 7, and a stem body 21a shown in Figure 7 can be used to form a modified type of valve 45a according to this invention.

The cap 20a is formed by forging and machining in a manner similar to that described above in connection with the cap 20 but the cap is provided with a dependent flange 22a on which a valve seat surface 22b can be formed, or in which a groove can be cut to receive a Stellite seating ring. In the cap 20a, the valve seat or the valve seat groove is provided by the cap instead of by the stem body. The grain bands 25a of the cap 20a define all exterior surfaces of the cap with their sides only and the terminal ends of the grain bands are confined in the vertical weld area 46a uniting the parts together. The stem body 21a is flared straight outwardly and the ends of the grain bands 31a in this stem terminate in a vertical rim adapted to mate with the vertical rim provided by the flange 22a of the cap. The rim of the cap is press fitted onto the rim of the body member and the weld area 46a formed by the electrical surge described above. The weld area 46a confines the ends of the grain bands.

From the above description it should be understood that the valves of this invention are made from separate caps and stem bodies which are integrally united along a weld area of appreciable width. This weld area confines all grain band ends of the metal parts so that the head portion of the valve is defined only by the sides of metal grain bands. The welding is effected when the metal parts are urged together under pressure so as to bring rims defined by the grain band ends thereof into good contacting relation. A surge of high frequency electric current will instantaneously form the weld without oxidizing any of the interior surface of the valve parts. The weld formed by the surge of current between the rims is essentially a complete surface bond which does not change metallurgical properties of the parts. However, the bond is complete over the entire contacting area of the rims, and is very strong in spite of the fact that it does not extend deeply into the metal.

The valve seats for the valves of this invention can be formed from separate rings of good wearing alloy such as Stellite welded into grooves provided in either the outwardly flaring ends of the stem portion or the peripheral flange of the cap portion of the valve. If the outwardly flaring end of the stem portion is undercut to provide a groove for receiving the seating ring, any end grain bands on the head cap which overlap the groove are covered by the welded-in seating ring as shown in Figure 6.

If desired, as shown in Figures 6A and 7A, the cap members 20 or 20a of Figures 6 and 7 can be replaced with cast caps 20' and 20a' respectively to form modified valves 45' and 45a'. In Figures 6A and 7A, parts identical with those shown in Figures 6 and 7 have been marked with the same reference numerals. The cast caps 20' and 20a' can thus be made of alloys which are not easily forged or machined. For example, iron alloys known as Nichrome steels; nickel, molybdenum and iron alloys known as Hastelloy steels; nonferrous nickel-chromium alloys known as Brightray; and chromium tungsten alloys known as Stellite, can be used to effectively resist the corroding gases and vapors in the combustion chamber of an internal combustion engine.

The cast caps 20' and 20a' are welded to the forged stem body members 21 or 21a and confine the ends of the metal grain bands of the body members as described above. The resulting poppet valves thus can have forged metal stems which resist the operating stresses resulting from reciprocation of the valves and highly corrosion-resistant caps.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A hollow head metal poppet valve comprising a one-piece metal cap having a dependent peripheral flange defining a rim of appreciable width, said cap having the metal grain bands thereof terminating in said rim and defining the exterior top and side walls of the cap with their sides only, a one-piece metal stem body member having an outwardly flaring hollow tulip end bounded by a circular rim of appreciable width, said body member having the metal grain bands thereof terminating in said rim and defining the exterior side walls of the body member with their sides only, and a weld integrally uniting said rims to unite the cap and body member for providing the valve with all of the exposed surfaces in the head area thereof defined only by the sides of the metal grain bands.

2. A hollow head metal poppet valve comprising a one-piece hollow metal cap having a dependent circular flange with a flat bottom rim portion of appreciable width, said cap having the metal grain bands thereof terminating in said rim bottom and defining the exterior top and side walls of the cap with their sides only, a one-piece metal stem body member having an outwardly flaring hollow tulip end bounded by a flat circular rim top of appreciable width, said body member having the metal grain bands thereof terminating in said rim top and defining the exterior side walls of the body member with their sides only, and a weld uniting said rims to confine the ends of the grain bands and provide the valve with exterior surfaces defined only by the sides of the metal grain bands.

3. A hollow head poppet valve comprising a hollow cast corrosion-resistant metal head cap having a depending portion defining a rim surface of appreciable area, a forged stress-resisting metal stem body member having a hollow outwardly flaring tulip end terminating in a rim surface of appreciable area sized for mating with the rim surface of the cap, said forged body member having the metal grain bands thereof terminating in the rim surface thereof and defining the exterior side walls of the body member with their sides only, and a weld integrally uniting the cap and body members along their mating rim surfaces and covering the ends of the metal grain bands.

4. A hollow head metal poppet valve comprising a hollow metal head cap having a depending rim portion of appreciable width a metal stem body member having an outwardly flaring hollow tulip end bounded by a rim of appreciable width, said body member having the metal grain bands thereof terminating in said rim and defining the exterior side walls of the body member with their sides only, said depending rim of the head cap completely covering the rim of the body member to encase the grain band ends, and a weld integrally uniting the rim surfaces.

5. A hollow head poppet valve comprising a hollow cast corrosion-resistant metal head cap having a depending portion defining a rim surface of appreciable area, a forged stress-resisting metal hollow stem body member terminating in a rim surface of appreciable area sized for mating with the rim surface of the cap, said forged body member having the metal grain bands thereof terminating in the rim surface thereof and defining the exterior side walls of the body member with their sides only, and a weld integrally uniting the cap and body members along their mating rim surfaces and covering the ends of the metal grain bands.

ARCHIE T. COLWELL.